Sept. 27, 1932.   T. H. THOMAS   1,879,645
SAFETY CAR EQUIPMENT
Filed Sept. 4, 1929   2 Sheets-Sheet 1
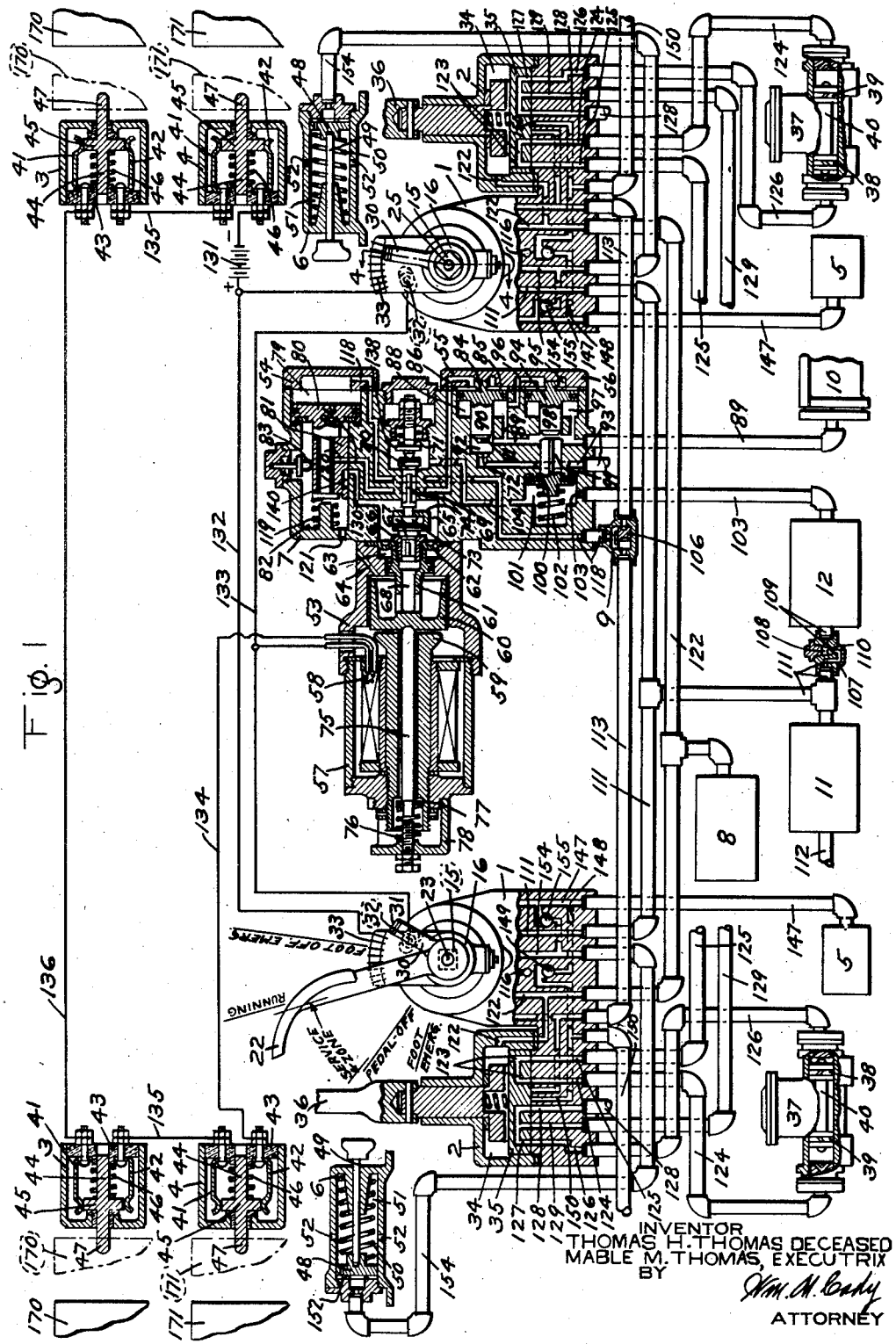
INVENTOR
THOMAS H. THOMAS DECEASED
MABLE M. THOMAS, EXECUTRIX
BY
Wm. N. Cady
ATTORNEY Sept. 27, 1932.   T. H. THOMAS   1,879,645
SAFETY CAR EQUIPMENT
Filed Sept. 4, 1929   2 Sheets-Sheet 2
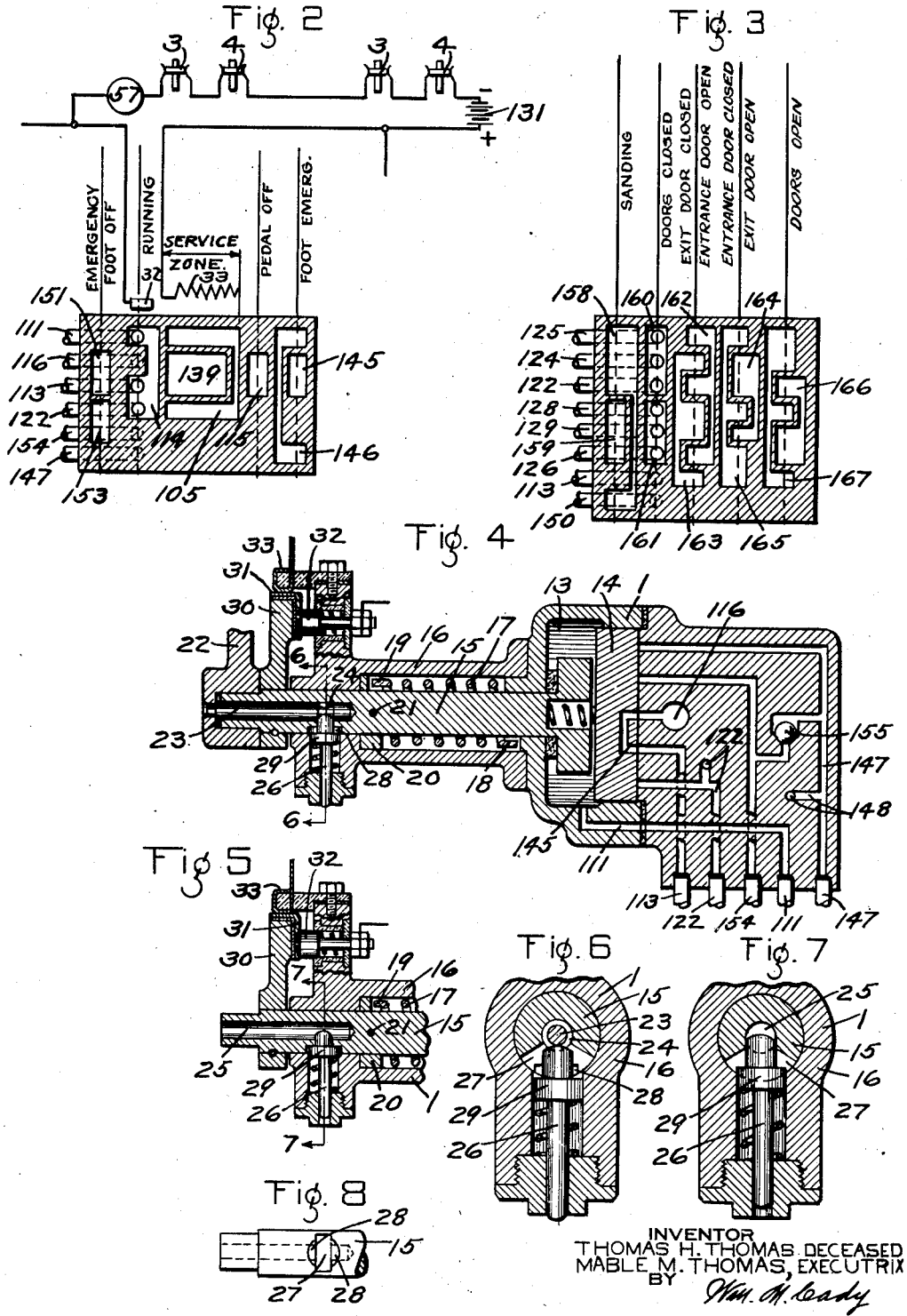
INVENTOR
THOMAS H. THOMAS, DECEASED
MABLE M. THOMAS, EXECUTRIX
BY
Wm. M. Cady
ATTORNEY Patented Sept. 27, 1932

1,879,645

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed September 4, 1929. Serial No. 390,282.

This invention relates to safety car control equipments and has for its principal object to provide an improved electro-pneumatic safety car control equipment.

Another object of the invention is to provide an improved electro-pneumatic safety car control equipment in which the brake apparatus is normally controlled through the medium of foot operated means, thus obviating the use of the hand operated devices commonly employed in such equipment and leaving the operator's hands free for controlling the operation of the car doors, making change, collecting fares and for any other purpose.

Another object of the invention is to provide a foot controlled safety car control equipment having novel means for controlling the graduated application and graduated release of the brakes.

A further object of the invention is to provide foot controlled valve means adapted to be automatically locked in pedal off position upon the removal of the operating pedal and automatically unlocked upon the application of said pedal to said valve means.

Other objects and advantages will appear in the following more detailed description.

In the accompanying drawings, Figure 1 is a diagrammatic view, partly in section, of a foot controlled electro-pneumatic safety car control equipment embodying the invention; Fig. 2 is a development view of one of the foot controlled brake valve devices in running position, a portion of the electrical equipment being shown diagrammatically; Fig. 3 is a development view of one of the door controlling valve devices; Fig. 4 is an enlarged sectional view taken longitudinally through the brake valve device on the line 4—4 of Fig. 1 showing the foot pedal applied and the brake valve device in "pedal off" position, a portion of the brake valve device being broken away to more clearly illustrate the manner of mounting one of the electric contact terminals in the bracket secured to the brake valve casing; Fig. 5 is a like view of a portion of the brake valve device with the foot pedal removed; Figs. 6 and 7 are enlarged sectional views taken on the lines 6—6 and 7—7 of Figs. 4 and 5 respectively, and Fig. 8 is an enlarged view showing the underside of a portion of the operating stem or shaft of the brake valve device.

As shown in the accompanying drawings, the electro-pneumatic safety car control equipment is of the double end type comprising, at each end of the car, a foot controlled brake valve device 1, a door controlling valve device 2, door interlock switch devices 3 and 4, a sanding reservoir 5 and a circuit breaker device 6. The equipment also comprises a control valve mechanism 7, a door control and auxiliary sanding reservoir 8, a double check valve device 9, a brake cylinder 10 and main reservoirs 11 and 12.

Each of the foot controlled brake valve devices 1 may comprise a casing having a chamber 13 containing a rotary valve 14 which is operatively connected to a rotatable operating stem 15, suitably journalled, adjacent its inner end, in the casing and adjacent its outer end, in a bracket member 16 secured to and extending outwardly from the casing.

Within the bracket member 16, and surrounding the stem 15, is a torsion spring 17, having its inner end 18 anchored in the casing and its outer end 19 anchored to a plate 20 which is contained in the bracket member and which is secured to the stem 15 by means of a pin 21. The force of this spring tends, at all times, to rotate the stem 15 in an anti-clockwise direction.

The extreme outer end portion of the stem 15 is preferably made square in cross section and is adapted to be operatively engaged by a foot pedal 22, said pedal having a recess formed therein which corresponds in shape to the outer end portion of the stem and which permits of the easy application and removal of the pedal to and from the stem.

The foot pedal 22 is provided with an extension 23, which, in the present embodiment of the invention, is in the form of a round rod having one end secured to the pedal. Adjacent its free end, this rod is provided with a groove 24.

When the foot pedal is in its operative position, the extension 23 is received in an axial bore 25 in the outer end portion of the stem 15, and within the groove 24, is engaged by the rounded inner end of a spring pressed plunger 26, which is slidably mounted in the outer end portion of the bracket member 16, the inner end portion of the plunger extending through a slotted opening 27 in the stem 15. On each side of the opening 27, the stem 15 is provided with a recess 28 for the reception of a portion of a collar 29 on the plunger 26.

By reason of the engagement of the pedal extension 23 by the inner end of the plunger 26, the foot pedal will be held against accidental separation from the stem 15 and the plunger collar 29 will be maintained entirely within the bracket member 16 so that the stem may be freely rocked back and forth to control the brakes.

The opening 27 in the stem and the recesses 28 for the reception of portions of the plunger collar 29 are so located that when the foot pedal is moved to "pedal off" position and the pedal pulled outwardly a sufficient distance that the end of the extension 23 is clear of the plunger 26, the plunger will be forced inwardly, by the pressure of its spring, a sufficient distance that the plunger collar 29 will engage the stem 15 within the recesses 28 and will thus positively lock the stem against unintentional rotation when the pedal is removed from the stem.

In applying the pedal to the stem, the free end of the pedal extension 23 engages the inner end of the plunger 26 and moves it, against the pressure of its spring, a sufficient distance that the collar 29 will be out of interlocking engagement with the stem 15 so that the stem may again be freely operated to control the brakes.

Secured to the stem 15 intermediate the outer end of the bracket member 16 and the square end portion of the stem, is an arm 30 carrying a contact plate 31 which is suitably insulated from the arm, and which is adapted to engage with a spring pressed contact terminal 32 slidably carried by the bracket member 16 and with a resistance winding 33 also carried by the bracket member. The contact terminal 32 and the winding 33 are suitably insulated from each other and from the bracket member.

In the present embodiment of the invention, a portion of each of the door controlling valve devices 2 is integral with a portion of the adjacent brake valve device 1 and may comprise a casing portion, having a chamber 34 containing a rotary valve 35 which is adapted to be operated by the usual handle (not shown) which is applied to the upper end of an operating shaft 36 operatively connected to the rotary valve. The shaft 36 is of such a length that the operating handle may be manipulated by hand.

Each door controlling valve device is operative to control the operation of an entrance door engine 37 and an exit door engine. The exit door engines are not shown on the drawings but it will be understood that they may be identical with the door engine 37 in construction and operation.

Each door engine may comprise a casing containing spaced door opening and door closing pistons 38 and 39 respectively, which are connected together by a bar 40 which may be operatively connected to a door by means of the usual mechanism (not shown).

The door interlock switch devices 3 and 4 at each end of the car are identical in construction and each may comprise a casing containing spaced contact terminals 41 and 42 which are secured to a block 43 of insulating material forming one of the walls of the casing. Also contained in the casing is a connector 44 which is slidably mounted in the casing and is suitably insulated therefrom. This connector is provided with a connector portion 45 which is adapted to contact with the contact terminals 41 and 42 and thus connect them, there being a spring 46 interposed between and engaging one side of the portion 45 and the inner side of the insulating block 43, the pressure of which spring tends, at all times, to maintain the connector in such position that the portion 45 connects the contact terminals. The connector is also provided with a portion 47 which extends through and beyond one of the walls of the casing into the path of travel of the door and is adapted to be engaged by said door when the door is opened a predetermined degree.

Each circuit breaker device 6 may comprise a casing containing a piston 48 having a stem 49 projecting through an opening in the end of the casing and adapted to operate the usual line switch (not shown), for opening the car motor electric supply circuit when a dead-man's emergency application of the brakes is initiated. The piston 48 is subject to the pressure of a spring 50 contained in a chamber 51 at one side of the piston said chamber being connected to the atmosphere through passages 52.

The control valve mechanism comprises a magnet valve device 53, a control valve device 54, a release valve device 55 and an application valve device 56.

The magnet valve device 53 comprises a magnet 57 having a magnet coil 58 and a pole piece 59. Adjacent to the end of the pole piece 59, is an armature 60 having a stem 61 which is secured at its inner end to a flexible diaphragm 62.

The chamber 63 formed intermediate the armature 60 and the diaphragm 62 is open to the atmosphere by way of a passage 64. The chamber 65 at the opposite side of the diaphragm 62 contains a threaded plug 66 which clamps the stem 61 to the diaphragm 62 and said plug is provided with a seat for an exhaust valve 67 which controls communication from chamber 65 to chamber 63 by way of a passage 68.

Formed in a partition wall of the casing, is an opening through which the stem 69 of a valve 70 extends, the wall being provided with a seat for the valve 70, which valve is subject to the pressure of a spring 71 tending to seat the valve. The valve 70 and spring 71 are contained in a chamber 138.

The stem 69 of the valve 70 is provided, at one end with a button 73 which engages in a recess of a cage 74 secured to the valve 67.

Extending through a central bore in the pole piece 59, is a rod 75, the lower end of which engages the armature 60. A spring 76 engages washers 77 which rest on a shoulder provided at the outer end of the rod, and the outer end of the spring engages a cap 78 which is secured to the magnet 57. The pressure of the spring 76 thus acts through the rod 75 to urge the armature 60 away from the pole piece 59.

The control valve device 54 may comprise a casing having a chamber 79 containing a piston 80 which is adapted to operate a slide valve 81 contained in a chamber 82, said slide valve being maintained against its seat by a spring pressed roller 83 engaging the back side of the slide valve. With the fluid in the equipment at atmospheric pressure, the pressure of a spring 119 maintains the piston 80 and slide valve 81 in their extreme right hand positions.

The release valve device 55 may comprise a casing containing a piston 84, the chamber 85, at one side of which, leads to the seat for the control slide valve 81 through a passage 86. The chamber 88 at the other side of the piston is constantly connected to the brake cylinder 10 through a passage and pipe 89. The piston 84 is provided with a stem 90 having a valve 91 at its end contained in a chamber 92 which is adapted to seat on a valve seat 72, which valve is normally unseated and establishes communication from the brake cylinder to the atmosphere by way of pipe and passage 89, valve chamber 92 and a passage and pipe 93.

The application valve device 56 may comprise a casing containing a piston 94, the chamber 95 at one side of which is connected to the chamber 88, in the release valve device 55, through a passage 96. The chamber 97 at the other side of this piston, as well as the chamber 88 in the release valve device, are constantly connected to the brake cylinder through passage and pipe 89. The piston 94 is provided with a stem 98 which is adapted to engage the fluted stem 99 of a valve 100, which is contained in a chamber 101, and which is normally maintained seated by the pressure of a spring 102.

The valve chamber 101 is constantly connected to the main reservoir 12 through pipe and passage 103. The chamber 138 of the magnet valve device is connected to the chamber 101 through a passage 104.

The double check valve device 9 is interposed in the combined brake pipe and safety control pipe 113 and may comprise a casing containing a double check valve 106 adapted to establish communication from the pipe 113 leading from the brake valve device 1 at the operating end of the car.

Interposed between the main reservoirs 11 and 12, is a check valve device 107, which may comprise a casing having a chamber 108 connected to the main reservoir 12 through a passage and pipe 109 and containing a ball check valve 110. The reservoir 11 is connected to the underside of the ball check valve 110 through a pipe and passage 111.

Assuming the foot valve device 1 at the rear end of the car to be in "pedal off" position, the brake valve device at the head end of the car in "running" position, the door controlling valve devices 2 in "doors closed" position, the doors closed, the control piston 80 and slide valve 81 in their right hand positions and the other parts of the mechanism in the positions shown in the drawings, the operator may now cause the usual compressor (not shown) to operate to supply fluid under pressure to the main reservoir 11 through a pipe 112.

Fluid under pressure thus supplied to the main reservoir 11, flows to the chamber 13 in each of the brake valve devices 1 by way of the main reservoir passages and pipe 111. It will here be noted that the main reservoir 11 is constantly connected to the chambers 13.

From the chamber 13 in the brake valve device at the head end of the car, fluid under pressure flows to the safety control pipe 113 by way of a port 114 in the rotary valve 14. The brake valve device at the rear end of the car being in "pedal off" position, the pipe and passage 113 at the right hand side of the double check valve device 9 is connected to the atmosphere by way of a cavity 115 in the rotary valve 14 of the rear brake valve device and an atmospheric passage 116, so that the pressure of fluid supplied to the safety control pipe 113, through the brake valve device 1 at the head end of the car, will maintain the valve at the right hand end of the double check valve 106 seated, and the valve, at the left hand end, unseated. With the double check valve 106 in this position, fluid under pressure supplied to the pipe 113 flows past the unseated check valve to the control piston chamber 79 through a passage and pipe 118.

Fluid under pressure thus supplied to the control piston chamber 79 causes the control piston and connected slide valve 81 to shift to its left hand position against the pressure of the spring 119, in which position, a port 120 in the control slide valve 81 registers with the passage 86, thus connecting the piston chamber 85 of the release valve device 55 and the control slide valve chamber 82 which latter chamber is constantly connected to atmosphere through a passage 121.

From the port 114 in the rotary valve 14 of the brake valve device, at the head end of the car, fluid under pressure flows to the door supply passages and pipe 122 and to the door control and auxiliary sanding reservoir 8 thus charging said reservoir. The passage 122 is constantly connected to the chambers 34 in the door controlling valve devices 2, so that when these valve devices are in their "doors closed" positions, fluid under pressure will flow from the passages 122 to the door closing sides of the entrance door engine 37 through ports 123 in the rotary valves 35 and passages and pipes 124, and to the door closing sides of the exit door engines through ports 123 and passages and pipes 125. With the rotary valves 35 in "doors closed" position, the door opening sides of the entrance door engines are connected to the atmosphere through pipes and passages 126, ports 127 in the rotary valves 35 and passages and pipes 128, and the door opening sides of the exit door engines are connected to the atmosphere through pipes and passages 129, ports 127 and the passages and pipes 128. It will thus be seen that all of the doors will be maintained closed by the pressure of fluid in the door closing sides of the door engines.

From the main reservoir pipe 111 fluid under pressure also flows past the ball check valve 110 of the check valve device 107 and through the pipe 109 to the main reservoir 12 and from thence to the valve chamber 101 in the application valve device 56. From this chamber 101 fluid under pressure flows to the seat of the control slide valve 81 by way of passage 104, valve chamber 138 in the magnet valve device 53, past the unseated valve 70 and its fluted stem 69, diaphragm chamber 65 and a passage 130.

With the foot pedal in "running" position, the contact plate 31 carried by the arm 30 secured to and movable with the stem 15 of the brake valve device is in contact with the contact terminal 32 and out of contact with the resistance winding 33.

With the equipment thus fully charged, and it is desired to effect a full service application of the brakes, the operator, by the use of his foot, operates the foot pedal 22 forward against the power of the torsion spring 17, and after the pedal has been moved a short distance in this direction, the contact plate 31 carried by the arm 30 contacts with one end of the winding 33 carried by the bracket member 16. Now since the contact plate 31 is in contact with the contact terminal 32, a source of current, such as a battery 131 is connected in circuit with the magnet coil 58 of the magnet valve device 53, over a circuit wire 132, which is connected at one end to the positive terminal of the battery 131 and which is connected at the other end to one end of the winding 33, over the contact plate 31, contact terminal 32, a wire 133, through the magnet coil 58, a wire 134, contact terminal 42, connector 45 and contact 41 of the door interlock switch device 4 at the head end of the car, a wire 135, contact terminal 42, connector 45 and contact terminal 41 of the door interlock switch device 3 at the head end of the car, a wire 136, and from thence to the negative terminal of the battery 131 through the door interlock switch devices 3 and 4 at the rear end of the car which are also connected in series with each other.

The maximum current supply, flowing over this circuit, energizes the magnet, and the magnetic pull of the pole piece 59 causes the armature 60 to be operated toward the left hand forcing the rod 75 in the same direction against the pressure of the spring 76, permitting the pressure of a spring 71 contained in the valve chamber 138 to seat the valve 70. Further, with the magnet thus energized the valve seat on the bushing 66 is moved away from the valve 67, so that communication is established from the chamber 65 to the atmosphere. After the magnet 57 has been thus energized, a continued forward movement of the foot pedal 22 causes more of the resistance winding 33 to be cut into the circuit, decreasing the amount of current flowing through the magnet coil 58, which correspondingly decreases the magnetic pull on the armature 60, thus permitting the pressure of the spring 76 acting through the rod 75 to move the armature 60, stem 61 and bushing 66 inwardly a sufficient distance that the bushing seats on the valve 67 closing communication from the chamber 65 to the atmosphere by way of passage 68, chamber 63 and passage 64.

At substantially the same time as the bushing 66 of the magnet valve device seats on the valve 67, the control piston chamber 79 is vented to the atmosphere through passage and pipe 118, past the unseated valve of the double check valve device 9, through pipe and passage 113, a cavity 139 in the rotary valve 14 of the brake valve device 1 at the head end of the car and exhaust passage 116. With the chamber 79 thus vented, the pressure of the spring 119 operates the control piston 80 and slide valve 81 to their extreme right hand positions, in which, the atmospheric connection from the release valve piston chamber 85 by way of passage 86, port 120 in the slide valve 81, slide valve chamber 82 and passage 121, is closed off, and communication is established from the chamber 65 in the magnet valve device to the chamber 85 in the release valve device through passage 130, a cavity 140 in the control slide valve 81 and passage 86.

When this latter communication is established, a continued forward movement of the foot pedal causes more of the resistance winding 33 to be cut in circuit, further reducing the current supply and consequently further reducing the magnetic pull on the armature 60 of the magnet valve device, permitting the pressure of the spring 76 to cause the valve 70 to unseat.

With the valve 70 unseated, fluid under pressure from the chamber 138, which is constantly connected to the main reservoir 12, flows to the chamber 85 of the release valve device, past the unseated valve 70 to the chamber 65 and from thence to the chamber 85 through the communication established by the control slide valve 81.

Fluid under pressure thus supplied to the chamber 85 causes the release piston to move to its extreme left hand position, seating the valve 91 on its seat 72, thus closing off communication from the brake cylinder to the atmosphere.

When the valve 91 seats, the release piston 84 will have been moved beyond the passage 96, so that, from the chamber 85 in the release valve device, fluid under pressure flows through this passage to the chamber 95 of the application valve device, causing the application piston 94 to move to its extreme left hand position unseating the application valve 100, against the pressure of the spring 102, so that, fluid under pressure from the valve chamber 101, which is constantly connected to the main reservoir 12 flows to the brake cylinder 10, past the unseated valve 100 and its fluted stem 99 and through passage and pipe 89.

It will here be noted that a full service application of the brakes can only be effected when the magnet 57 of the magnet valve device is deenergized, so that the full pressure of the spring 76 acts to maintain the valve 70 unseated. The deenergization of the magnet in the present embodiment of the invention is accomplished, in effecting a service application of the brakes, when the pedal 22 has been moved forward a sufficient distance that the circuit through the magnet valve device is opened by the contact plate 31, carried by the arm 30 of the brake valve device, being moved out of contact with the contact terminal 32 carried by the bracket member 16.

It will also be noted that in effecting a full service application of the brakes, the foot pedal 22 may be moved continuously over the "service zone" of the brake valve device.

With the rotary valve 14 in service position the door control and auxiliary sanding reservoir 8 and rotary valve chamber 34 of the door control valve device are maintained charged from the main reservoir 11 through pipe and passage 111, rotary valve chamber 13, a port 105 in the rotary valve 14 and passage and pipe 122.

If, instead of effecting a full service application of the brakes, it is desired to limit the brake cylinder pressure, the pedal 22 is moved forwardly to and maintained in any desired position within the "service zone" and the amount of the resistance winding 33 cut in circuit will determine the amount of current flowing through the magnet coil 58 of the magnet valve device, and consequently, the magnetic pull on the armature 60. Now when the pressure of fluid in the diaphragm chamber 65, as supplied from the main reservoir 12, by way of pipe 103, valve chamber 101, passage 104, valve chamber 138 in the magnet valve device and past the unseated valve, acting on one side of the flexible diaphragm 62, plus the force of the magnetic pull on the armature 60, is sufficient to overcome the pressure of the spring 76, the diaphragm will flex toward the left hand permitting the pressure of the spring 71 to seat the valve 70 and thus close off the further supply of fluid under pressure to the diaphragm chamber 65.

With the supply of fluid under pressure to the chamber 65 thus closed off, the pressure of the spring 76 will prevent the further movement of the diaphragm 62 toward the left hand. During this movement of the diaphragm the valve 67 is maintained seated so as to prevent the escape of fluid under pressure from the chamber 65 to the atmosphere. Since the opposing forces acting on the diaphragm 62 are now substantially equal, the magnet valve device will remain in a balanced condition until the pressure of fluid in the chamber 65 is varied.

Since the piston chamber 95, in the application valve device 56, is connected to the chamber 65, in the magnet valve device 53, by way of passage 96, release piston chamber 85, passage 86, cavity 140 in the control slide valve 81 and passage 130, the pressure of fluid in the chamber 95 will be substantially equal to the pressure of fluid in the chamber 65. As hereinbefore stated, the piston chamber 97 in the application valve device 56 is constantly connected to the brake cylinder 10 by way of pipe and passage 89, so that, when the brake cylinder pressure present in chamber 97 becomes substantially equal to the pressure of fluid in chamber 95, the pressure of the spring 102, contained in the valve chamber 101, causes the valve 100 to seat and thus close off the further supply of fluid under pressure from the main reservoir 12 to the brake cylinder. As the valve 100 is being seated it operates toward the right hand and through the engagement of its fluted stem 99 with the stem 98 of the piston 94, causes said piston 94 to move in the same direction. When the valve 100 is seated the piston 94 will be in its extreme right hand position.

Should it be desired to further increase the brake cylinder pressure, the operator forces the foot pedal 22 further forward, cutting in more of the resistance winding 33 and as a result decreases the magnetic force acting on the armature 60 and unbalances the magnet valve device 53 so that the pressure of the spring 76 will cause the armature 60 and diaphragm 62 to move toward the right hand unseating the valve 70 and permitting fluid at main reservoir pressure present in chamber 138 in the magnet valve device to flow to the application piston chamber 95. The pressure of fluid in the chamber 95 will now cause the application piston 94 to move to its left hand position, unseating the valve 100 and permitting fluid under pressure from the main reservoir 12 to flow to the brake cylinder. Now when the pressure of fluid in the diaphragm chamber is great enough to again operate the diaphragm to permit the valve 70 to be again seated by the pressure of the spring 71, the application valve device 56 will again operate to close off the further supply of fluid under pressure to the brake cylinder 10.

It will thus be seen that the operator, by the manipulation of the foot pedal 22, may easily effect a graduated application of the brakes.

Should it be desired to completely release the brakes, the operator relieves some of his pressure on the foot pedal 22 and the power of the torsion spring 17 causes the brake valve device to operate toward "running" position. When the brake valve device has thus been operated to "running" position, the operator, by foot pressure, maintains it in this position.

With the brake valve device in "running" position, fluid under presure is again supplied to the control piston chamber 79 from the main reservoir 12, causing the control piston 80 and connected slide valve 81 to move to their extreme left hand positions against the pressure of the spring 119 in which positions the release piston chamber 85 is connected to the atmosphere by way of passage 86, port 120 in the control slide valve 81, slide valve chamber 82 and passage 121. With the piston chamber 85 thus vented, fluid at brake cylinder pressure present in the chamber 88 causes the release piston 84 to operate to its extreme right hand position, unseating the release valve 91. As the valve piston 84 is thus being operated, it moves beyond the passage 96, thus establishing communication from the chamber 95, in the application valve device, to the chamber 88. When the valve 91 is unseated fluid under pressure in the brake cylinder is vented to the atmosphere by way of pipe and passage 89, valve chamber 92, past the unseated valve 91 and through passage and pipe 93.

When an application of the brakes has been effected, and the pressure of fluid in the application piston chamber 95 and the pressure of fluid in the chamber 97 are substantially equal, the pressure of the spring 102 causes the valve 100 to seat, so that, when the release valve 91 is unseated in releasing the brakes, there will be no loss of fluid under pressure from the main reservoir 12.

When the brake valve device is in running position, the contact plate 31, carried by the arm 30 is out of contact with the resistance winding 33, so that, the electric circuit through the magnet coil 58 is open and the magnet 57 is deenergized and due to the pressure of the spring 76 the valve 70 is again unseated, against the pressure of the spring 71.

Should it be desired to effect a graduated release of the brakes, the operator, instead of permitting the foot pedal to return directly to running position as he does in effecting a full release, may cause the brake valve device to stop in any desired intermediate position or positions within the "service zone". Upon the operation of the brake valve device toward running position the resistance winding 33 is gradually cut out of circuit thus increasing the magnetic force of the magnet coil 58 acting on the armature 60. When the foot pedal is stopped within the "service zone", the magnetic force of the magnet coil 58, acting on the diaphragm 62, through the medium of the armature 60, together with the pressure of fluid in the chamber 65, as supplied from the main reservoir 12 past the unseated valve 70, causes the diaphragm to operate toward the left hand, against the pressure of the spring 76, a sufficient distance that the valve 70 will be seated, closing off the further supply of fluid under pressure from the main reservoir 12 to the chamber 65 so that the valve seat will be moved away from the valve 67 after the valve 70 is seated.

With the valve seat thus moved away from the valve 67, fluid under pressure from the release piston chamber 85 is vented to the atmosphere by way of passage 86, cavity 140 in the control slide valve 81, passage 130, chamber 65 in the magnet valve device, past the open valve 67, through passage 68 in the armature stem 61, diaphragm chamber 63 and passage 64. With the chamber 85 thus vented, fluid at brake cylinder pressure present in the chamber 88 causes the release piston 84 to move toward the right hand, unseating the release valve 91, thus venting fluid under pressure from the brake cylinder 10 to the atmosphere. As the pressure in the chamber 65 reduces, the pressure of the spring 76 causes the valve seat on the bushing 66 to seat on the valve 67 closing off the further venting of fluid under pressure from the chamber 65 of the magnet valve device and consequently from the release piston chamber 85. Now when the brake cylinder pressure present in chamber 88 becomes less than the pressure of fluid in the chamber 85, the fluid under pressure in this chamber 85 causes the release piston 84 to again operate to seat the valve 91 and thereby close off the further release of fluid under pressure from the brake cylinder to the atmosphere.

It will be seen that by operating the foot pedal forward over the "service zone", the brake cylinder pressure may be increased as desired, and that by controlling the return of the foot pedal over the "service zone", the brake cylinder pressure may be decreased as desired.

To effect an emergency application of the brakes, the operator, by the use of the foot pedal 22, operates the brake valve device forward to "foot emergency" position, in which position, the contact plate 31, carried by the arm 30, is out of contact with the contact terminal 32 carried by the bracket member 16, so that the circuit through the magnet 57 is open and the magnet deenergized.

Further, with the brake valve device in this position, the piston chamber 79, in the control valve device, is vented to the atmosphere by way of passage and pipe 118, double check valve device 9, passage and pipe 113, a cavity 145 in the rotary valve 14 of the brake valve device and passage 116.

With the magnet 57 deenergized and the piston chamber 79 vented to the atmosphere, the several parts of the equipment will operate to effect an application of the brakes in substantially the same manner as a service application is effected. There is, however an additional operation in effecting an emergency application, i. e., the sanding of the track rails which is accomplished by the flow of fluid under pressure from the main reservoir 11 through the usual sand traps (not shown) by way of pipe and passage 111, valve chamber 13 in the brake valve device, a port 146 in the rotary valve 14, a passage 147, a choked passage 148, past a ball check valve 149 and a passage and pipe 150. Fluid under pressure is also supplied through the passage 147 and pipe to the sanding reservoir 5.

Should the operator become incapacitated so that he can no longer maintain forward pressure on the foot pedal 22, the force of the torsion spring 17 causes the brake valve device to automatically operate to "foot off" position. As the brake valve device is thus operated the contact plate 31 carried by the arm 30 is moved out of contact with the resistance winding, opening the magnet circuit and thus deenergizing the magnet 57.

With the brake valve device in this position, the piston chamber 79 of the control valve device is vented to the atmosphere by way of passage and pipe 118, the double check valve device 9, pipe and passage 113, a cavity 151 in the rotary valve 14 and passage 116.

With the brake valve device in this position and the magnet 57 deenergized, the several parts of the equipment will operate to effect an application of the brakes in the same manner as has been described in effecting a full service application.

It will be noted that in "running" position the door control and auxiliary sanding reservoir 8 is charged with fluid under pressure so that when the brake valve device is in "foot off" position, fluid under pressure flows from this reservoir to the piston chamber 152 in the circuit breaker device 6 by way of pipe and passage 122, a cavity 153 in the rotary valve 14 of the brake valve device and passage and pipe 154. From the passage 154 fluid under pressure flows to the sanding reservoir 5, past a ball check valve 155 and through passage and pipe 147, thus charging the sanding reservoir 5.

Fluid under pressure thus supplied to the piston chamber 152 in the circuit breaker device 6, causes the piston 48 thereof to operate toward the right hand a sufficient distance that the stem 49 thereof will operate the line switch to open the car motor circuit. When the line switch has been opened, the piston will have passed the passages 52, so that fluid under pressure from the reservoir 8 will be vented to the atmosphere through these passages. Since the entrance and exit door closing pipes 124 and 125, respectively, are connected to the valve chamber 34 in the door control valve device 2, and this chamber is connected to the passage 122, the door closing sides of the entrance and exit door engines are vented to the atmosphere along with the reservoir 8.

Now, when the reservoir 8 and the door closing sides of the door engines have been fully vented to the atmosphere, the pressure of the circuit breaker spring 50, causes the piston 48 to operate to retract the plunger or stem 49 to permit the line switch to be operated to its circuit closing position.

The pressure of fluid in the reservoir 8 will reduce rapidly and the ball check valve 155 will prevent the back flow of fluid under pressure from the sanding reservoir 5 to the passage and pipe 154 so that the pressure of fluid from said reservoir 5 cannot reduce with the reservoir 8.

Fluid under pressure from the sanding reservoir blows down through the usual sand traps (not shown) by way of pipe and passage 147, choked passage 148, past the ball check valve 149 and passage and pipe 150. The choke in the passage 148 so restricts the flow of fluid from the sanding reservoir 5, that the reduction in the sanding reservoir pressure will be comparatively slow so as to insure the proper sanding of the track rails for a time after the circuit breaker device has operated to open the circuit to the car motors or, in other words, so as to insure the sanding of the track rails until the car comes to a stop.

The check valve 149 is for the purpose of preventing the charging of the sanding reservoir 5 from the passage 150 when the door control valve device is in sanding position, and the reason for this is that if the reservoir were permitted to be charged there would be a flow of fluid from the reservoir to the sand traps for some time after the door control valve had been moved out of sanding position which of course would be objectionable.

To release the brakes after a foot off emergency application, the foot pedal must be pressed forward and held in "running" position. As the brake valve device is operated to "running" position communication from the passage 122 to the passage 154 is closed off, and communication is again established through which fluid under pressure from the main reservoir 11 is supplied to the piston chamber 79 in the control valve device and to the door closing sides of the entrance and exit door engines. The release of the brakes is now effected in substantially the same manner as has hereinbefore been described in connection with the release of the brakes after a service application.

If it should be desired to sand the track rails in starting the car or in effecting a service application of the brakes, the operator operates the door control valve device 2 to "sanding" position, in which, fluid under pressure in the rotary valve chamber 34, as supplied from the door control and auxiliary sanding reservoir 8, through pipe and passage 122, blows down through the sand traps by way of a port 158 in the rotary valve 35, and passage and pipe 150. From the port 158 the pressure of fluid in the door closing sides of the entrance and exit door engines is maintained through pipes 124 and 125, respectively. With the door control valve device in this position the door opening sides of the door engines are maintained vented to the atmosphere by way of a cavity 159 in the rotary valve 35. It will thus be seen that the doors will be maintained closed when sanding.

When the door control valve device 2 is returned to "doors closed" position, the sanding passage 150 is lapped by the rotary valve 35, thus closing off the flow of fluid to the sand traps. In this position the pressure of fluid in the door closing sides of the door engines is maintained by way of a port 160 in the rotary valve and the door opening sides of the engines are maintained vented to the atmosphere by way of a cavity 161 in the rotary valve.

If, when the car has been brought to a stop, the operator desires to open the entrance door and to maintain the exit door closed, he operates the door control valve device to "entrance door open position" in which, fluid under pressure is supplied from the valve chamber 34 to the door closing side of the exit door engine, and the door opening side of the entrance door engine by way of a port 162 in the rotary valve 35, and the door closing side of the entrance door engine and the door opening side of the exit door engine are vented to the atmosphere by way of pipes 124 and 129 respectively, a cavity 163 in the rotary valve 35 and passage and pipe 128. With the door closing side of the entrance door engine thus vented, the pressure of fluid supplied to the door opening side, the engine will be caused to operate to open the entrance door, and with the door opening side of the exit door engine maintained vented and the supply of fluid under pressure to the door closing side maintained, the exit door will remain closed.

The cavity 163 also establishes communication from the control pipe 113 to the atmosphere by way of passage and pipe 128 but with the car stopped and the brakes applied, this will have no effect on the apparatus, since in effecting an application of the brakes, in bringing the car to a stop, the pipe 113 is vented to the atmosphere through the brake valve device 1. The establishing of this communication does have an important effect upon the braking apparatus if the door should be opened while the car is in motion, and this will hereinafter be fully described.

If it is desired to open the exit door and maintain the entrance door closed, the operator moves the door control valve device to exit door open position, in which, the door opening side of the exit door engine and the door closing side of the entrance door engine are supplied with fluid under pressure by way of a port 164 in the rotary valve 35, and in which, the door closing side of the exit door engine and the door opening side of the entrance door engine are vented to the atmosphere by way of a cavity 165 in the rotary valve 35 and passage and pipe 128. With the door closing side of the exit door engine thus vented to the atmosphere, the pressure of fluid supplied to the door opening side, the engine will be caused to operate to open the exit door, and with the door opening side of the entrance door engine maintained vented and the supply of fluid under pressure to the door closing side maintained, the entrance door will remain closed.

The cavity 165 also establishes communication from the control pipe 113 to the atmosphere by way of passage and pipe 118 but with the brakes applied and the car stopped this will have no effect upon the apparatus.

If it is desired to open both doors the operator operates the door control valve device to "doors open" position in which the door opening sides of both door engines are supplied with fluid under pressure by way of a port 166 in the rotary valve 35 and in which the door closing sides of these engines are vented to the atmosphere by way of a cavity 167 in the rotary valve 35, and passage and pipe 128. With the door closing sides of both engines vented and the door opening sides supplied with fluid under pressure, the engines will be caused to operate to open both doors.

The cavity 167 also connects the control pipe 113 to the atmosphere through passage and pipe 128 but with the brakes applied and the car stopped this will have no effect on the equipment.

Should the brake valve device be in "running" position and the operator operates the door control valve device to any door open position the piston chamber 79 is vented to the atmosphere by way of passage and pipe 118, double check valve device 9, pipe and passage 113, either of the cavities 163, 165 or 167 in the rotary valve 35 and passage and pipe 128 so that the pressure of the spring causes the control piston 80 and slide valve 81 to move to application position. Now since in running position the magnet 57 is deenergized, the valve 70 is unseated so that a full service application of the brakes will be automatically effected.

It will be noted that if the car is stopped, the brakes cannot be released until the door control valve device is moved out of "door open" position to "doors closed" position, thus insuring the closing of the doors preparatory to the releasing of the brakes. Further, it will be noted that if the car is in motion, the brake valve device in "running" position and the door control valve device operated to any door open position, the brakes will be automatically applied and the car brought to a stop unless the operator, in the mean time, returns the door control valve device to "doors closed" position. By returning the door control valve device to "doors closed" position, the atmospheric connection from the control piston chamber 79 to the atmosphere through this valve device is closed off and pressure again restored to the chamber 79 causing the control valve device to operate to effect the release of the brakes.

At the beginning of the "service zone" it is possible for the operator to maintain the contact plate 31 in contact with the beginning of the winding 33 and with the contact terminal 32 and thus maintain the magnet 57 energized, so that the valve 70 of the magnet valve device will be maintained seated, which would, without the use of the door interlock switch devices, prevent main reservoir pressure from flowing to the piston chamber 85 in the release valve device when the control valve device is caused to operate by the operation of the door control valve device to any door open position and thus prevent an application of the brakes. When the brake valve device is at the beginning of the "service zone" as just described and the operator operates the door control valve device to any door open position, either the entrance door 170 or the exit door 171, as it moves, from its closed position as shown in full lines in Fig. 1 toward its open position, as shown in dot and dash lines, engages the end portion 47 of the connector of the door interlock switch device and moves the connector 45 out of contact with the contact terminals 41 and 42 against the pressure of the spring 46, thus opening the circuit through the magnet coil 58 of the magnet valve device deenergizing the magnet 57 which permits the pressure of the spring 76 to operate the magnet valve device to unseat the valve 70. With the valve 70 seated fluid under pressure from the main reservoir 12 is supplied to the release piston chamber 85 which causes the several other parts of the equipment to operate to effect an application of the brakes in substantially the same manner as has been described in connection with a full service application.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a safety car control equipment, the combination with an electro-pneumatic brake apparatus, of a brake valve device for controlling the operation of said apparatus, and a foot pedal rockable about a single axis for controlling the operation of said brake valve device, said brake valve device being operative to one position by pressure on said pedal for effecting an emergency application of the brakes, and operative to another position upon the relief of pressure on said pedal for also effecting an emergency application of the brakes.

2. In a safety car control equipment, the combination with an electro-pneumatic brake apparatus, of a combined foot valve and electric circuit controlling device controlled by the pressure of the foot of an operator for normally controlling the operation of said apparatus to effect an application and release of the brakes and operative upon relief of pressure by the operator for effecting an emergency application of the brakes.

3. In a safety car control equipment, the combination with an electro-pneumatic brake apparatus, of a combined foot valve and electric circuit controlling device controlled by the pressure of the foot of an operator for normally controlling the operation of said apparatus to effect a service and an emergency application of the brakes and to effect the release of the brakes and operative upon the entire relief of pressure by the operator for effecting an emegency application of the brakes.

4. The combination with an electro-pneumatic brake apparatus, of means subject to variations in the foot pressure of an operator for normally controlling the operation of said apparatus to effect a service application of the brakes, the graduated application and graduated release of the brakes, an emergency application of the brakes and the complete release of the brakes, said means being operative upon the entire relief of the operator's foot pressure for effecting an emergency application of the brakes.

5. In an electro-pneumatic brake, the combination with a brake cylinder, of valve means operative by fluid under pressure to supply fluid under pressure to the brake cylinder to effect an application of the brakes, a pipe normally charged with fluid under pressure, electro-responsive means operative to supply fluid under pressure to operate said valve means, a valve device operative upon a reduction in the pressure of fluid in said pipe for establishing communication through which fluid under pressure flows from said electro-responsive means to said valve means, and a brake valve device operative to control the operation of said electro-responsive means and valve device.

6. In an electro-pneumatic brake, the combination with a brake cylinder, of valve means operative by fluid under pressure to supply fluid under pressure to the brake cylinder to effect an application of the brakes, a pipe normally charged with fluid under pressure, electro-responsive means operative to supply fluid under pressure to operate said valve means, a valve device operative upon a reduction in the pressure of fluid in said pipe for establishing communication through which fluid under pressure flows from said electro-responsive means to said valve means, a brake valve device operative to control the operation of said electro-responsive means and valve device, and means associated with the brake valve device for varying the flow of an electric current to said electro-responsive means to cause said electro-responsive means to operate to vary the pressure of fluid in said brake cylinder.

7. In an electro-pneumatic brake, the combination with a brake cylinder, of valve means operative by fluid under pressure to supply fluid under pressure to the brake cylinder to effect an application of the brakes, a pipe normally charged with fluid under pressure, electro-responsive means operative to supply fluid under pressure to operate said valve means, a valve device operative upon a reduction in the pressure of fluid in said pipe for establishing communication through which fluid under pressure flows from said electro-responsive means to said valve means, and a brake valve device operative to control the operation of said electro-responsive means and for reducing the pressure of fluid in said pipe.

8. In an electro-pneumatic brake, the combination with a brake cylinder, of valve means operative by fluid under pressure to supply fluid under pressure to the brake cylinder to effect an application of the brakes, a pipe normally charged with fluid under pressure, electro-responsive means operative to supply fluid under pressure to operate said valve means, a valve device operative upon a reduction in the pressure of fluid in said pipe for establishing communication through which fluid under pressure flows from said electro-responsive means to said valve means, a brake valve device operative to control the operation of said electro-responsive means and valve device, and means associated with the brake valve device for increasing and decreasing the flow of an electric current to said electro-responsive means to cause said electro-responsive means to operate to vary the brake cylinder pressure inversely proportional to the amount the current flow to said electro-responsive means is increased and decreased.

9. In an electro-pneumatic brake, the combination with fluid pressure controlled valve means for effecting the application and release of the brakes, electro-responsive means operative to control the supply and release of fluid under pressure to and from said valve means, a valve device operative upon a reduction in fluid pressure for establishing communication through which fluid supplied and released to and from said valve means flows, and means operative manually for reducing the pressure of fluid in said valve device and for controlling the operation of said electro-responsive means.

10. In an electro-pneumatic brake, the combination with fluid pressure controlled valve means for effecting the application and release of the brakes, electro-responsive means operative upon a decrease in the flow of an electric current therethrough to supply fluid under pressure to said valve means and operative upon an increase in the flow of current therethrough for releasing fluid under pressure from said valve means, a valve device operative upon a reduction in fluid pressure for establishing communication through which fluid under pressure supplied and released to and from said valve means flows, and manually operative means for controlling the operation of said valve device and for increasing and decreasing the flow of current to said electro-responsive means.

11. In an electro-pneumatic brake, the combination with a brake cylinder, of fluid pressure operated valve means for supplying and releasing fluid under pressure to and from said brake cylinder, electro-responsive means operative to supply fluid under pressure to operate said valve means to supply fluid under pressure to the brake cylinder and operative to release fluid under pressure from said valve means to cause said valve means to operate to release fluid under pressure from the brake cylinder, a valve device operative upon a reduction in fluid pressure to establish communication through which fluid under pressure is supplied and released to and from said valve means, and a brake valve device operative to control the operation of said electro-responsive means and said valve device.

12. In an electro-pneumatic brake, the combination with a brake cylinder, of fluid pressure operated valve means for supplying and releasing fluid under pressure to and from said brake cylinder, electro-responsive means operative to supply fluid under pressure to operate said valve means to supply fluid under pressure to the brake cylinder and operative to close off the supply of fluid under pressure to said valve means and to release fluid under pressure from said valve means to cause said valve means to operate to release fluid under pressure from the brake cylinder, pressure sensitive means operative to establish communication through which fluid under pressure is supplied and released to and from said valve means, and a brake valve device for controlling the operation of said electro-responsive means and said pressure sensitive means.

13. In an electro-pneumatic brake, the combination with a brake cylinder, of a valve device normally establishing communication from the brake cylinder to the atmosphere and operative by fluid under pressure for closing said communication, valve mechanism controlled by the operation of said valve device for supplying fluid under pressure to the brake cylinder and for closing off the supply of fluid under pressure to the brake cylinder, electro-responsive means operated according to the amount of electric current flowing therethrough for controlling the supply and release of fluid under pressure to and from said valve device, valve means operative upon a reduction in fluid pressure for establishing communication through which fluid supplied and released to and from said valve device flows, and a brake valve device for reducing the pressure in said valve means and for varying the flow of electric current to said electro-responsive means.

14. In an electro-pneumatic brake, the combination with a brake cylinder, of a valve device normally establishing communication from the brake cylinder to the atmosphere and operative by fluid under pressure for closing said communication, valve mechanism controlled by the operation of said valve device for supplying fluid under pressure to the brake cylinder and for closing off the supply of fluid under pressure to the brake cylinder, valve means operative to control the supply and release of fluid to and from said valve device, a magnet, and means operated according to the opposing forces of the magnet and the pressure of fluid acting on said valve device for controlling the operation of said valve means to control the pressure of fluid acting on said valve device, and means for varying the force of said magnet.

15. In an electro-pneumatic brake, the combination with a brake cylinder, of a valve device normally establishing communication from the brake cylinder to the atmosphere and operative by fluid under pressure for closing said communication, valve mechanism controlled by the operation of said valve device for supplying fluid under pressure to the brake cylinder and for closing off the supply of fluid under pressure to the brake cylinder, a magnet, and means for supplying and releasing fluid under pressure to and from said valve device, said means being operated according to the opposing forces of said magnet and the pressure of fluid in said valve device, and means for varying the force of said magnet.

16. In an electro-pneumatic brake, the combination with a brake cylinder, of a valve device normally establishing communication from the brake cylinder to the atmosphere and operative by fluid under pressure for closing said communication, valve mechanism controlled by the operation of said valve device for supplying fluid under pressure to the brake cylinder and for closing off the supply of fluid under pressure to the brake cylinder, a magnet, and means for supplying and releasing fluid under pressure to and from said valve device, said means being operated according to the opposing forces of said magnet and the pressure of fluid in said valve device, a brake valve device, and means operative with said brake valve device for varying the amount of electric current flowing to said magnet and thereby varying the force of said magnet.

17. In an electro-pneumatic brake, the combination with a brake cylinder, of a valve device normally establishing communication from the brake cylinder to the atmosphere and operative by fluid under pressure for closing said communication, valve mechanism controlled by the operation of said valve device for supplying fluid under pressure to the brake cylinder and for closing off the supply of fluid under pressure to the brake cylinder, a magnet, and means for supplying and releasing fluid under pressure to and from said valve device, said means being operative upon a decrease in the amount of current flowing to said magnet to increase the pressure of fluid in said valve device, and operative upon an increase in the amount of current flowing to said magnet to decrease the pressure of fluid in said valve device, and means for controlling the current flow to said magnet.

18. In an electro-pneumatic brake, the combination with a brake cylinder, of a pressure chamber, a valve device subject to variations in the pressures of fluid in said brake cylinder and pressure chamber for opening and closing a communication from the brake cylinder to the atmosphere, valve means subject to the pressure of fluid supplied from said pressure chamber by said valve device, when said valve device is in position to close the communication from the brake cylinder to the atmosphere, to supply fluid under pressure to the brake cylinder, said valve means being subject to the pressure of a spring to close off the supply of fluid under pressure to the brake cylinder when said valve device is in position to establish said communication, a magnet, means subject to the opposing forces of said magnet and the pressure of fluid in said pressure chamber for varying the pressure of fluid in said chamber, and means for varying the force of said magnet.

19. In an electro-pneumatic brake, the combination with a brake cylinder, of a pressure chamber, a valve device subject to variations in the pressures of fluid in said brake cylinder and pressure chamber for opening and closing a communication from the brake cylinder to the atmosphere, valve means subject to the pressure of fluid supplied from said pressure chamber by said valve device, when said valve device is in position to close the communication from the brake cylinder to the atmosphere, to supply fluid under pressure to the brake cylinder, said valve means being subject to the pressure of a spring to close off the supply of fluid under pressure to the brake cylinder when said valve device is in position to establish said communication, a magnet, means subject to the opposing forces of said magnet and the pressure of fluid in said pressure chamber for varying the pressure of fluid in said chamber, variable resistance means for controlling the amount of current flowing to said magnet, and foot operated means for operating said resistance means.

20. In an electro-pneumatic brake, the combination with valve mechanism operative to effect the application and release of the brakes, electro-responsive means operative to supply fluid under pressure to operate said valve mechanism to effect an application of the brakes, a valve device operative upon a reduction in fluid pressure for establishing communication through which fluid supplied by said electro-responsive means flows to said valve mechanism, and operative upon an increase in fluid pressure for closing said communication and for venting fluid under pressure supplied to said valve mechanism to the atmosphere to effect the release of the brakes, and a brake valve device operative to control the flow of fluid from and to said valve device and to control the current flow to said electro-responsive means.

21. In an electro-pneumatic brake, the combination with valve mechanism operative to effect the application and release of the brakes, electro-responsive means operative to supply fluid under pressure to operate said valve mechanism to effect an application of the brakes, a valve device operative upon a reduction in fluid pressure for establishing communication through which fluid supplied by said electro-responsive means flows to said valve mechanism, and operative upon an increase in fluid pressure for closing said communication and for venting fluid under pressure supplied to said valve mechanism to the atmosphere to effect the release of the brakes, and foot controlled means for controlling the operation of said valve device and said electro-responsive means.

22. In an electro-pneumatic brake, the combination with valve mechanism operative to effect the application and release of the brakes, electro-responsive means operative to supply fluid under pressure to operate said valve mechanism to effect an application of the brakes, a pipe normally charged with fluid under pressure, a valve device normally subject to the pressure of fluid in said pipe and operative upon venting of fluid under pressure from said pipe to establish communication through which fluid supplied by said electro-responsive means flows to said valve mechanism, and operative upon an increase in the pressure of fluid in said pipe to close communication from said electro-responsive means to said valve mechanism and to establish communication through which fluid supplied to said valve mechanism by said electro-responsive means is vented to the atmosphere to control the operation of said valve mechanism to effect the release of the brakes, and a foot controlled brake valve device for controlling the supply and release of fluid under pressure to and from said pipe and for controlling the flow of an electric current to said electro-responsive means.

23. In a safety car control equipment, the combination with a brake cylinder, of valve mechanism operative to supply and release fluid under pressure to and from the brake cylinder, electro-responsive means operative to supply and release fluid under pressure to and from said valve mechanism to control the operation of the valve mechanism to vary the brake cylinder pressure, a valve device operative upon a reduction in fluid pressure to establish communication through which fluid under pressure supplied and released to and from said valve mechanism flows and operative upon an increase in fluid pressure to close said communication and establish communication through which fluid under pressure supplied to said valve mechanism is released to the atmosphere to permit said valve mechanism to operate to release fluid under pressure from the brake cylinder to release the brakes, a brake valve device having a position in which fluid under pressure is supplied to said valve device, and operative to a position and over a predetermined zone for releasing fluid under pressure from said valve device and for varying the flow of current to said electro-responsive means to vary the pressure of fluid in said brake cylinder.

24. In a safety car control equipment, the combination with electro-pneumatic apparatus operative to control the application and release of the brakes, of a brake valve device operative to two positions to control the operation of said apparatus to effect an emergency application of the brakes, and operative over a zone intermediate said positions to control the operation of said apparatus to effect a service application of the brakes and to effect the graduated application and release of the brakes.

25. In a safety car control equipment, the combination with electro-pneumatic apparatus operative to control the application and release of the brakes, of a combined brake valve and electric circuit controlling device operative to two positions to control the operation of said apparatus to effect an emergency application of the brakes, and operative over a zone intermediate said positions to control the operation of said apparatus to effect an application of the brakes according to the position of said device within the limits of said zone.

26. In a safety car control equipment, the combination with electro-pneumatic apparatus operative to control the application and release of the brakes, of a combined brake valve and electric circuit controlling device operative to two positions to control the operation of said apparatus to effect an emergency application of the brakes, and operative over a zone intermediate said positions to control the operation of said apparatus to effect a service application of the brakes.

27. In a safety car control equipment, the combination with electro-pneumatic apparatus operative to control the application and release of the brakes, of a brake valve device operative to two positions to control the operation of said apparatus to effect an emergency application of the brakes, and operative over a zone intermediate said positions to control the operation of said apparatus to effect the graduated application and release of the brakes.

28. In a safety car control equipment, the combination with electro-pneumatic apparatus operative to control the application and release of the brakes, of a combined brake valve and electric circuit controlling device operative in two positions to control the operation of said apparatus to effect an emergency application of the brakes, in an intermediate position to effect the release of the brakes, and over a zone intermediate one of the first mentioned positions and said intermediate position to effect a service application of the brakes.

29. In a safety car control equipment, the combination with electro-pneumatic apparatus operative to control the application and release of the brakes, of a brake valve device operative in two positions to control the operation of said apparatus to effect an emergency application of the brakes, in an intermediate position to effect the release of the brakes, and over a zone intermediate one of the first mentioned positions and said intermediate position to effect an application of the brakes according to the position of the brake valve device within the limits of said zone.

30. In a safety car control equipment, the combination with an electro-pneumatic brake apparatus, of a combined brake valve and brake switch device subject to variations in the foot pressure of an operator for normally controlling the operation of said apparatus to effect the application and release of the brakes and operative upon the entire relief of the operator's foot pressure to effect an emergency application of the brakes.

31. In a safety car control equipment, the combination with an electro-pneumatic brake apparatus, of a combined brake valve and brake switch device subject to variations in the foot pressure of an operator for normally controlling the operation of said apparatus to effect the application and release of the brakes and operative upon the entire relief of the operator's foot pressure to effect an emergency application of the brakes, the sanding of the track rails upon which the car runs, and the opening of the electric motor circuit.

32. In an electro-pneumatic brake, the combination with a brake cylinder, of fluid pressure controlled valve means operative to supply and release fluid under pressure to and from said brake cylinder, electro-responsive means for controlling the pressure of fluid in said valve means, said electro-responsive means being operated upon a predetermined current flow for preventing the flow of fluid under pressure to said valve means and operated upon a reduction in current flow below said predetermined flow for supplying fluid under pressure to operate said valve means to supply fluid under pressure to the brake cylinder, and means for controlling the current flow to said electro-responsive means.

33. In an electro-pneumatic brake, the combination with a brake cylinder, of fluid pressure controlled valve means operative to supply and release fluid under pressure to and from said brake cylinder, electro-responsive means for controlling the pressure of fluid in said valve means, said electro-responsive means being operated upon a predetermined current flow for preventing the flow of fluid under pressure to said valve means and operated upon a reduction in current flow below said predetermined flow for supplying fluid under pressure to operate said valve means to supply fluid at a pressure inversely proportional to the amount the current is reduced below said predetermined flow, and means for varying current flow to said electro-responsive means.

34. In an electro-pneumatic brake, the combination with a brake cylinder, of fluid pressure controlled valve means operative to supply and release fluid under pressure to and from said brake cylinder, electro-responsive means for controlling the pressure of fluid in said valve means, said electro-responsive means being operated upon a predetermined current flow for preventing the flow of fluid under pressure to said valve means and operated upon a reduction in current flow below said predetermined flow for supplying fluid under pressure to operate said valve means to supply fluid under pressure to the brake cylinder, a valve normally subject to fluid under pressure for closing communication through which said electro-responsive means supplies fluid to said valve means and operative upon the venting of fluid under pressure from said valve means to establish said communication, and means operative in effecting an application of the brakes for controlling the current flow to said electro-responsive means and for venting fluid under pressure from said valve device when the current flow to said electro-responsive means is reduced below said predetermined current flow.

35. In an electro-pneumatic brake, the combination with a brake cylinder, of fluid pressure controlled valve means operative to supply and release fluid under pressure to and from said brake cylinder, electro-responsive means for controlling the pressure of fluid in said valve means, said electro-responsive means being operated upon a predetermined current flow for preventing the flow of fluid under pressure to said valve means and operated upon a reduction in current flow below said predetermined flow for supplying fluid under pressure to operate said valve means to supply fluid under pressure to the brake cylinder, a valve normally subject to fluid under pressure for closing communication through which said electro-responsive means supplies fluid to said valve means and operative upon the venting of fluid under pressure from said valve means to establish said communication, and means operative in effecting an application of the brakes for controlling the current flow to said electro-responsive means and for maintaining the pressure of fluid in said valve means until the current flow to said electro-responsive means is reduced below said predetermined current flow.

36. In an electro-pneumatic brake, the combination with a brake cylinder, of fluid pressure controlled valve means operative to supply and release fluid under pressure to and from said brake cylinder, a pressure chamber from which fluid under pressure is adapted to be supplied to said valve means, a valve normally unseated establishing communication through which fluid under pressure is supplied to said chamber, a magnet normally deenergized and maintaining said valve unseated, a valve device normally subject to fluid under pressure for preventing the flow of fluid from said chamber to said valve means and operative upon the venting of fluid under pressure from the valve device to establish communication through which fluid under pressure flows from said chamber to said valve means, and means operative in effecting an application of the brakes for controlling an electric current to energize said magnet to seat said valve and for venting fluid under pressure from said valve device after said valve is seated.

37. In a safety car control equipment, the combination with a brake cylinder, of electro-pneumatic means operative to supply and release fluid under pressure to and from the brake cylinder, a foot controlled device for normally controlling the operation of said electro-pneumatic means, fluid pressure operated means for opening and closing a door of the car, and a door control valve device operative to control the operation of said fluid pressure operated means, said door control valve device being adapted, in door open position, to effect the operation of said electro-pneumatic means to supply fluid under pressure to the brake cylinder independently of said foot controlled device.

38. In a safety car control equipment, the combination with a brake cylinder, valve means controlled by fluid under pressure to supply and release fluid under pressure to and from said brake cylinder, electro-responsive means for controlling the supply of fluid under pressure to said valve means, said electro-responsive means being operated upon a predetermined current flow for preventing the flow of fluid under pressure to said valve means and operated upon the cutting of the current flow thereto for supplying fluid under pressure to the valve means, a pipe normally charged with fluid under pressure, a valve device subject to the pressure of fluid in said pipe for preventing the flow of fluid from said electro-responsive means to said valve means and operative upon the venting of fluid under pressure therefrom for establishing communication through which fluid under pressure supplied by said electro-responsive means flows to said valve means, foot controlled means operative to a position to cause said electro-responsive means to operate to close off the supply of fluid under pressure to the valve means and to maintain the pressure of fluid in said pipe, fluid pressure operated means for opening and closing a door of the car, a door control valve device operative to control the operation of said fluid pressure operated means, said door control valve device being operative, in door open position, to vent said pipe for effecting the operation of said valve device, and means operated upon the opening of the car door for cutting off the flow of current to said electro-responsive means to cause said means to operate to supply fluid under pressure to said valve means.

39. In a safety car control equipment, the combination with valve means subject to fluid under pressure for effecting the application and release of the brakes, a pressure chamber adapted to be connected to said valve means, a valve normally unseated and supplying fluid under pressure to said chamber, a magnet device normally deenergized and maintaining said valve unseated, said magnet device being operative upon energization to permit said valve to seat to close off the supply of fluid under pressure to said chamber, a pipe charged with fluid under pressure, a valve device subject to the pressure of fluid in said pipe for maintaining communication from said chamber to said valve means closed off and operative upon the venting of fluid from said pipe to establish communication from said chamber to said valve means, a brake valve device having a position in which said magnet is energized and the pressure of fluid in said pipe is maintained, means operative to control the opening of a door of the car and to vent said pipe, and means operative upon the opening of said door for deenergizing said magnet to effect an application of the brakes.

40. In a safety car control equipment, the combination with valve means subject to fluid under pressure for effecting the application and release of the brakes, a pressure chamber adapted to be connected to said valve means, a valve normally unseated and supplying fluid under pressure to said chamber, a magnet device normally deenergized and maintaining said valve unseated, said magnet device being operative upon energization to permit said valve to seat to close off the supply of fluid under pressure to said chamber, a pipe charged with fluid under pressure, a valve device subject to the pressure of fluid in said pipe for maintaining communication from said chamber to said valve means closed off and operative upon the venting of fluid from said pipe to establish communication from said chamber to said valve means, a brake valve device having a position in which said magnet is energized and the pressure of fluid in said pipe is maintained, valve means operative manually for controlling the opening of a door of the car and for venting said pipe to the atmosphere, and means operated automatically upon the opening of said door for effecting the deenergization of said magnet.

41. In a fluid pressure brake, the combination with foot controlled valve means for controlling the brakes, said valve means having a foot off position and a pedal off position different from said foot-off position, of a removable foot pedal for controlling the operation of said valve means, said valve means being operative automatically to foot off position upon the relief of foot pressure on said pedal and operative to pedal off position by foot pressure on said pedal, and means operative upon the removal of said foot pedal in the pedal off position of said valve means for maintaining the valve means in pedal off position against movement to foot off position.

42. In a fluid pressure brake, the combination with foot controlled valve means for controlling the brakes, said valve means having a foot off position and a pedal off position different from said foot-off position, of a removable foot pedal for controlling the operation of said valve means, said valve means being operative automatically to foot off position upon the relief of foot pressure on said pedal and operative to pedal off position by foot pressure on said pedal, and means operative upon the removal of said foot pedal in the pedal off position of said valve means for locking the valve means in pedal off position and operative upon the application of said pedal for unlocking the valve means.

43. In a fluid pressure brake, the combination with foot controlled valve means for controlling the brakes, said valve means having a foot off position and a pedal off position different from said foot-off position, of a removable foot pedal for controlling the operation of said valve means, said valve means being operative automatically to foot off position upon the relief of foot pressure on said pedal and operative to pedal off position by foot pressure on said pedal, and means operative upon the removal of said foot pedal in the pedal off position of said valve means for rendering the valve means inoperative to control the brakes.

44. In a fluid pressure brake, the combination with foot controlled valve means for controlling the brakes, said valve means having a foot off position and a pedal off position different from said foot-off position, of a removable foot pedal for controlling the operation of said valve means, said valve means being operative automatically to foot off position upon the relief of foot pressure on said pedal and operative to pedal off position by foot pressure on said pedal, and means operative upon the removal of said foot pedal in the pedal off position of said valve means for rendering the valve means inoperative to control the brakes and operative upon the application of said pedal for rendering the valve means operative to control the brakes.

45. In a fluid pressure brake, the combination with foot controlled valve means for controlling the brakes, said valve means having a foot off position and a pedal off position, of a removable foot pedal for controlling the operation of said valve means, spring means tending to operate said valve means to foot off position, and means operative upon the removal of said pedal in the pedal off position of the valve means for locking the valve means against movement to foot off position by the force of said spring.

46. In a foot valve device for controlling the operation of a fluid pressure brake, the combination with a casing, of a rotary valve in said casing, a bracket on said casing, a stem for operating said rotary valve, a removable foot pedal on said stem, an extension on said pedal extending into an axial bore in said stem and having a groove formed therein, and means mounted on said bracket engaging said extension within said groove for maintaining said pedal against accidental separation from said stem and operative to maintain said stem against rotation when the pedal is removed therefrom.

47. In a foot valve device for controlling the operation of a fluid pressure brake, the combination with a casing, of a rotary valve in said casing, a bracket on said casing, a stem for operating said rotary valve, a removable foot pedal on said stem, an extension on said pedal extending into an axial bore in said stem and having a groove formed therein, and means mounted on said bracket engaging said extension within said groove for maintaining said pedal against accidental separation from said stem and operative into positive locking engagement with said stem, when the pedal is removed therefrom, to prevent the rotation of the stem relative to said bracket.

48. In a safety car control equipment, the combination with a control pipe normally charged with fluid under pressure, of valve means operative upon the venting of fluid under pressure from said pipe for effecting an application of the brakes, a door engine normally subject to fluid pressure for maintaining a door of the car closed, a door control reservoir normally charged with fluid under pressure, a circuit breaker device operative by fluid under pressure for opening the car motor circuit, a sanding reservoir, a sanding pipe, a valve device automatically operative upon the incapacitation of an operator to vent fluid under pressure from said control pipe to effect an application of the brakes, and to establish communication through which fluid under pressure is supplied from said control reservoir to said circuit breaker device and sanding reservoir, said circuit breaker device being adapted to vent fluid under pressure from said door control reservoir and door engine to the atmosphere to balance the door, means for retarding the flow of fluid under pressure from said sanding reservoir to said sanding pipe, and means for preventing the back flow of fluid under pressure from said sanding reservoir to said control reservoir.

49. In a safety car control equipment, the combination with a control pipe normally charged with fluid under pressure, of valve means operative upon the venting of fluid under pressure from said pipe for effecting an application of the brakes, a door engine normally subject to fluid pressure for maintaining a door of the car closed, a door control reservoir normally charged with fluid under pressure, a circuit breaker device operative by fluid under pressure for opening the car motor circuit, a sanding reservoir, a sanding pipe, a valve device automatically operative upon the incapacitation of an operator to vent fluid under pressure from said control pipe to effect an application of the brakes, and to establish communication through which fluid under pressure is supplied from said control reservoir to said circuit breaker device and sanding reservoir, said circuit breaker device being adapted to vent fluid under pressure from said door control reservoir and door engine to the atmosphere to balance the door, means for retarding the flow of fluid under pressure from said sanding reservoir to said sanding pipe, and a check valve device operative to prevent the venting of fluid under pressure from said sanding reservoir through said circuit breaker device.

In testimony whereof, I have hereunto set my hand.

MABLE M. THOMAS,
*Executrix of the Last Will and Testament of Thomas H. Thomas, Deceased.*